(12) United States Patent
Bernasconi

(10) Patent No.: US 8,521,027 B2
(45) Date of Patent: Aug. 27, 2013

(54) SYSTEM AND METHOD FOR DEMULTIPLEXING OPTICAL MULTI-WAVELENGTH SIGNALS

(75) Inventor: Pietro Bernasconi, Holmdel, NJ (US)

(73) Assignee: Alcatel Lucent, Paris (FR)

( * ) Notice: Subject to any disclaimer, the term of this patent is extended or adjusted under 35 U.S.C. 154(b) by 354 days.

(21) Appl. No.: 12/662,797

(22) Filed: May 4, 2010

(65) Prior Publication Data

US 2010/0303463 A1 Dec. 2, 2010

(30) Foreign Application Priority Data

May 28, 2009 (EP) .................................... 09305492

(51) Int. Cl.
*H04J 14/02* (2006.01)
(52) U.S. Cl.
USPC ............................................... 398/82; 398/87
(58) Field of Classification Search
USPC ................................................ 398/82, 86–88
See application file for complete search history.

(56) References Cited

U.S. PATENT DOCUMENTS

| 7,167,647 B2 * | 1/2007 | Eldada et al. .................... 398/33 |
| 8,285,144 B2 * | 10/2012 | Yamada et al. .................. 398/79 |
| 2002/0081062 A1 * | 6/2002 | He .................................... 385/24 |
| 2004/0258423 A1 | 12/2004 | Winzer |
| 2006/0139735 A1 | 6/2006 | Caplan |
| 2007/0216988 A1 | 9/2007 | Caplan |

* cited by examiner

*Primary Examiner* — Leslie Pascal
(74) *Attorney, Agent, or Firm* — Harness, Dickey & Pierce

(57) ABSTRACT

A demultiplexer and a method of demultiplexing a multiplex of spatially separable multiple wavelength streams, where an incoming multiplex of multiple wavelength streams is separated into a first stream of wavelengths and a second stream of wavelengths according to at least one predetermined separation criterion. The first stream and the second stream are respectively input into a first and a second input port of a multi-input port, multi-output port frequency demultiplexer where the first stream and the second stream are separated into a first group of single wavelengths and a second group of single wavelengths respectively. The first group of single wavelengths is coupled to respective output ports and the second group of single wavelengths are coupled to respective output ports.

10 Claims, 6 Drawing Sheets

SYSTEM AND METHOD FOR DEMULTIPLEXING OPTICAL MULTI-WAVELENGTH SIGNALS

This application is based on and claims the benefit of the European patent application number 09305492.2, filed on May 28, 2009 the content of which is incorporated by reference herein in its entirety.

The present invention relates to demultiplexing optical multi-wavelength signals corresponding to any transmission format that comprises multiple wavelengths where the wavelengths comprise constituents that can be separated into distinct streams or detected according to differential detection schemes.

BACKGROUND OF THE INVENTION

Optical multi-wavelength signal transmissions are widely used for communication through optical networks. One example of such transmission is the Wavelength Division Multiplex (WDM) transmission where signals are transported by a plurality of optical carriers. In certain types of such transmission, some or all of individual optical carriers may transport signals comprising multiple streams that can be separated into distinct multiple sub-streams, or constituents, for detection. Even in the absence of sub-streams during the generation and the transport process of the signals, sub-streams can be generated for example at the receiving side to benefit from differential detection schemes.

Herein, the term constituent is meant to refer to a part of information transported by at least one optical wavelength; a plurality of constituents may form part or the totality of the total amount of information carried by a specific wavelength or multiple wavelengths. Examples of such constituents are the amplitude modulated signal of a demodulated QPSK signal and its complementary copy, or the in-phase and the quadrature-phase constituents of a differential quadrature-phase shift keying (DQPSK) signal, or the two orthogonal polarization constituents of a polarization-multiplexed signal. Those skilled in the art would realize that a constituent may not always be present within the original incoming signal, but it may be generated at certain steps of the transmission process. For example the complementary constituent of the QPSK signal is not explicitly present in the original signal and along the transmission line but it may be generated at a filtering step before reception.

Also, herein, any reference to a "separable stream" is to be understood to refer to a stream of wavelengths capable of being distinguished and separated into constituents by at least one category, for example by the type of modulation or by the polarization state, whereas reference to "differential detection" (also known as "balanced detection") is to be understood to refer to a detection technique based upon the concomitant detection of the signal and its complementary so that the overall detection sensitivity may be improved.

One example of such separable multiple wavelength streams is based upon DQPSK modulation format, which is used for high speed transmission, for example in optical communication networks. Another example of such separable multiple wavelength streams relies upon polarization multiplexed WDM signals. A further example may be a combination of the aforementioned DQPSK and polarization multiplexed WDM signals. One example of said multiple wavelengths where the wavelengths comprise constituents that can be detected according to differential detection schemes is a WDM signal modulated with quadrature-phase shift keying (QPSK) format. Also a combination of the aforementioned QPSK and polarization multiplexed WDM signals may be possible. Signals based upon coherent transmission formats may also be considered to comprise constituents that can be detected according to differential detection schemes.

The demultiplexing of multiple wavelengths into their constituents is in occasions typically performed by using a plurality of discrete components, each component typically dedicated to an individual optical carrier, which has somehow to be individually controlled in frequency, amplitude, phase, etc. for best detection results. This requires a plurality of separate control circuits in order to tune thermally, optically, or electrically, etc., all the demultiplexing elements.

SUMMARY

As a consequence of requiring a plurality of discrete elements, conventional demultiplexers would require a relatively large footprint and a relatively high power consumption and dissipation, which is undesired. Another drawback of using such discrete elements resides in the difficulty, or even practical impossibility of consolidating the entire demultiplexing arrangement into a single photonic integrated circuit.

However, the current trend in manufacturing photonic devices points towards opposite requirements, namely minimizing the footprint and the power consumption of the overall device, as well as simplifying as much as possible the integration of such components in a integrated circuit.

FIG. 1a is an exemplary schematic representation of a conventional arrangement for demultiplexing a WDM stream of QPSK-type signals, using a single optical demultiplexer, which for example is an arrayed waveguide grating (AWG), followed by an array of delay filters.

As shown in FIG. 1a, an input signal S, such as a WDM signal, comprising QPSK multiple wavelengths capable of being detected by differential detection schemes, is input into a 1×N AWG demultiplexer 10. The QPSK wavelengths are therefore demultiplexed and output from the AWG demultiplexer 10 in a plurality of modulated carriers $S_1, S_2, \ldots, S_N$. The output wavelengths $S_1, S_2, \ldots, S_N$ are then input into respective delay filters $11_1, 11_2, \ldots, 11_N$. The delay filters $11_1, 11_2, \ldots, 11_N$ are in charge of separating the incoming signal into main and complementary constituents of the wavelength.

Each delay filter then outputs the main constituent $S_{1a}, S_{2a}, \ldots, S_{Na}$ at one output port and the complementary constituent $S_{1b}, S_{2b}, \ldots, S_{Nb}$ at another output port. The main and complementary constituents are then detected by respective pair of photodiodes $12X_a$-$12X_b$, (X=1 ... N). It is to be noted that in practice, the complementary constituents of the signal may simply be ignored and the main signal be maintained for further processing. This is useful because using differential detection allows for a higher reception sensitivity which can reduce the impact of noise and other transmission impairments on the reception process.

FIG. 1b is an exemplary schematic representation of a conventional arrangement for demultiplexing a DQPSK-type signal, using an optical demultiplexer, which for example is an arrayed waveguide grating (AWG), followed by an array of power splitters, each one followed by a pair of delay filters. By properly combining the outputs of the two delay filters the in-phase and the quadrature-phase constituents of the DQPSK signals are retrieved. In this figure like elements have been given like reference numerals as those of FIG. 1a.

As shown in FIG. 1b, an input signal S, such as a WDM signal, comprising spatially separable DQPSK multiple wavelengths is input into a 1×N AWG demultiplexer 10. The DQPSK wavelengths are therefore demultiplexed and output from the AWG demultiplexer 10 in a plurality of modulated optical carriers $S_1, S_2, \ldots, S_N$. The output wavelengths $S_1, S_2, \ldots, S_N$ are then input in respective power splitters $13_1, 13_2, \ldots, 13_N$ where the power of the modulated carriers $S_1, S_2, \ldots, S_N$ are split into two parts, typically equal in value, which are each separately injected in respective pairs of delay filters $11_{1i}$-$11_{1q}$, $11_{2i}$-$11_{2q}$, ..., $11_{Ni}$-$11_{Nq}$. Each pair of delay filters comprises two filters with a slightly different delay response Typically $+\pi/4$ in one filter and $-\pi/4$ in the other so that the in-phase and the quadrature-phase constituents of the original signal are reconstructed into a pair of amplitude modulated signals. These reconstructed signals are detected by respective pairs of photodiodes $12_{Xi}$-$12_{Xq}$ (X=1 ... N) and turned into electrical signals for further signal processing.

As it can be appreciated, both the arrangements of FIGS. 1a and 1b require sufficient footprint as well as power supply commensurate with the number of components involved where the higher the number of the components, the larger footprint and power supply is required for the end product. Also the integration of such an arrangement into a photonic integrated circuit would be a complicated task.

FIG. 2a is an exemplary schematic representation of another conventional arrangement for demultiplexing a QPSK-type signal, using a single delay filter and two frequency demultiplexers, typically two AWGs.

As shown in FIG. 2a, an input signal S, such as a WDM signal, comprising QPSK multiple wavelengths capable of being detected by differential detection, is input into a delay filter 21 which is in charge of separating the incoming signal S into main $S_a$ and complementary $S_b$ constituents of the wavelength. Each of the two constituents $S_a$ and $S_b$ are then fed into a respective 1×N AWG demultiplexer $20_a$, $20_b$. The streams $S_a$ and $S_b$ are therefore demultiplexed and output from the respective AWG demultiplexers $20_a$ and $20_b$ in a plurality of separate wavelengths, namely $S_{a1}, S_{a2}, \ldots, S_{aN}$ are output from the first AWG demultiplexer $20_a$, and $S_{b1}, S_{a2}, \ldots, S_{bN}$ are output from the second AWG demultiplexer $20_b$.

Assuming that the stream $S_a$ outputs, for example, the main constituent of the input signal S, then the corresponding output wavelengths $S_{a1}, S_{a2}, \ldots, S_{aN}$ of the AWG demultiplexer $20_a$ would be the main constituents of the demultiplexed wavelengths of the original signal S. Likewise, assuming that the stream $S_b$ outputs, for example, the complementary constituents of the input signal S, then the corresponding output wavelengths $S_{b1}, S_{b2}, \ldots, S_{bN}$ of the AWG demultiplexer $20_b$ would be the complementary constituents of the demultiplexed wavelengths of the original signal. The output wavelengths $S_{a1}, S_{a2}, \ldots, S_{aN}$ of the AWG demultiplexer $20_a$ are then fed into respective detectors $22_{1a}, 22_{2a}, \ldots, 22N_a$. Likewise, the output wavelengths $S_{b1}, S_{b2}, \ldots, S_{bN}$ of the AWG demultiplexer $20_b$ are fed into respective detectors $22_{1b}, 22_{2b}, \ldots, 22_{Nb}$.

It may therefore be appreciated that the arrangement as represented in FIG. 2a requires less number of components as compared to the arrangement shown in FIG. 1a.

FIG. 2b is an exemplary schematic representation of another conventional arrangement for demultiplexing a DQPSK-type signal, using a splitter, a delay filter and two frequency demultiplexers, which for example are arrayed waveguide gratings (AWGs). In this figure like elements have been given like reference numerals as those of FIG. 2a.

As shown in FIG. 2b, an input signal S, comprising spatially separable DQPSK wavelengths is input into a power splitter 23 where the power of the incoming signal S is split into two parts, typically equal in value, which are each separately injected in a respective delay filter $21_i$, $21_q$. The delay filters $21_i$, $21_q$ have a slightly different delay response so that the in-phase and the quadrature-phase constituents of the original signal are reconstructed into a pair of amplitude modulated signals $S_i$, $S_q$. These reconstructed signals are input into respective 1×N AWG demultiplexers $20_i$ and $20_q$ where the signals $S_i$ and $S_b$ are demultiplexed and output from the respective AWG demultiplexers $20_i$ and $20_q$ in a plurality of separate wavelengths, namely $S_{i1}, S_{i2}, \ldots, S_{iN}$ are output from the first AWG demultiplexer $20_i$, and $S_{q1}, S_{q2}, \ldots, S_{qN}$ are output from the second AWG demultiplexer $20_q$.

Assuming that the stream $S_i$ outputs, for example, the in-phase constituent of the input signal S, then the corresponding output wavelengths $S_{i1}, S_{i2}, \ldots, S_{iN}$ of the AWG demultiplexer $20_i$ would be the in-phase constituents of the demultiplexed wavelengths of the original signal S. Likewise, assuming that the stream $S_q$ outputs, for example, the quadrature-phase constituents of the input signal S, then the corresponding output wavelengths $S_{q1}, S_{q2}, \ldots, S_{qN}$ of the AWG demultiplexer $20_q$ would be the quadrature-phase constituents of the demultiplexed wavelengths of the original signal. The output wavelengths $S_{i1}, S_{i2}, \ldots, S_{iN}$ of the AWG demultiplexer $20_i$ are then fed into respective detectors $22_{1i}, 22_{2i}, \ldots, 22_{Ni}$. Likewise, the output wavelengths $S_{q1}, S_{q2}, \ldots, S_{qN}$ of the AWG demultiplexer $20_b$ are fed into respective detectors $22_{1q}, 22_{2q}, \ldots, 22_{Nq}$. Here also it may be appreciated that the arrangement as represented in FIG. 2b requires less number of components as compared to the arrangement shown in FIG. 1a.

Similar to the arrangement discussed in relation to FIGS. 1a and 1b, this arrangement also requires sufficient footprint as well as power supply commensurate with the number of components involved. Also the integration of such arrangement into a photonic integrated circuit would also be a complicated task.

According to one embodiment of the invention there is provided a demultiplexer for demultiplexing multiple wavelength streams comprising a separator for separating the multiple wavelength streams into a first stream of wavelengths output from a first output of the separator and a second stream of wavelengths output from a second output of the separator wherein the first output of the separator is coupled to a first input of a multi-input port, multi-output port frequency demultiplexer and the second output of the separator is coupled to a second input of the multi-input port, multi-output port frequency demultiplexer.

According to some specific embodiments the separator comprises a delay filter and the multiple wavelength streams are QPSK-type stream.

According to some specific embodiments the separator comprises a power splitter and a delay filter and the multiple wavelength streams are DQPSK-type stream.

According to some specific embodiments the separator comprises a polarization splitter and the multiple wavelength streams are polarization multiplexed streams.

According to some specific embodiments the separator is a combination of at least one power splitter, at least one delay filter and at least one polarization splitter and the multiple wavelength streams are polarization multiplexed DPQSK streams.

According to some specific embodiments the frequency demultiplexer comprises at least a first output port located at an opposite side of the frequency demultiplexer with respect to the side where the first group of single wavelengths is input in the frequency demultiplexer, and at least a second output port located at an opposite side of the frequency demultiplexer with respect to the side where the second group of single wavelengths is input in the frequency demultiplexer.

Embodiment of the invention also relate to a receiver for receiving WDM signals comprising a demultiplexer according to the above embodiments.

According to yet another embodiment of the invention there is provided a method of demultiplexing multiple wavelength streams, the method comprising:

inputting multiple wavelength streams into a separator;
separating, according to at least one predetermined separation criterion, the multiple wavelength streams into a first stream of wavelengths and a second stream of wavelengths;
inputting the first stream of wavelengths into a first input port of a multi-input port, multi-output port frequency demultiplexer;
inputting the second stream of wavelengths into a second input of the multi-input port, multi-output port frequency demultiplexer;
separating the first stream into a first group of single wavelengths;
separating the second stream into a second group of single wavelengths;
coupling the first group of single wavelengths to respective first output ports of the frequency demultiplexer;
coupling the second group of single wavelengths to respective second output ports of the frequency demultiplexer.

According to some specific embodiments the first group of single wavelengths are coupled to respective output ports located at an opposite side of the frequency demultiplexer with respect to the side where the first group of single wavelengths is input in the frequency demultiplexer, and the second group of single wavelengths are coupled to respective output ports located at an opposite side of the frequency demultiplexer with respect to the side where the second group of single wavelengths is input in the frequency demultiplexer.

These and further features and advantages of the embodiments of the present invention are described in more detail in the following description as well as in the claims with the aid of the accompanying drawings.

DESCRIPTION OF EMBODIMENTS

According to embodiments of the invention, a multi-input port and multi-output frequency demultiplexer is used in a bi-directional scheme so as to provide a demultiplexing functionality of two streams of multiple wavelengths.

By way of non-limiting examples a frequency demultiplexer to be used in the solution provided herein may be array waveguide gratings (AWG) and echelle gratings which are known and available in the market. In the following description, array waveguide grating in discussed in the description of embodiments. However other frequency demultiplexers may also be used within the scope of the embodiments.

Figure 1A:
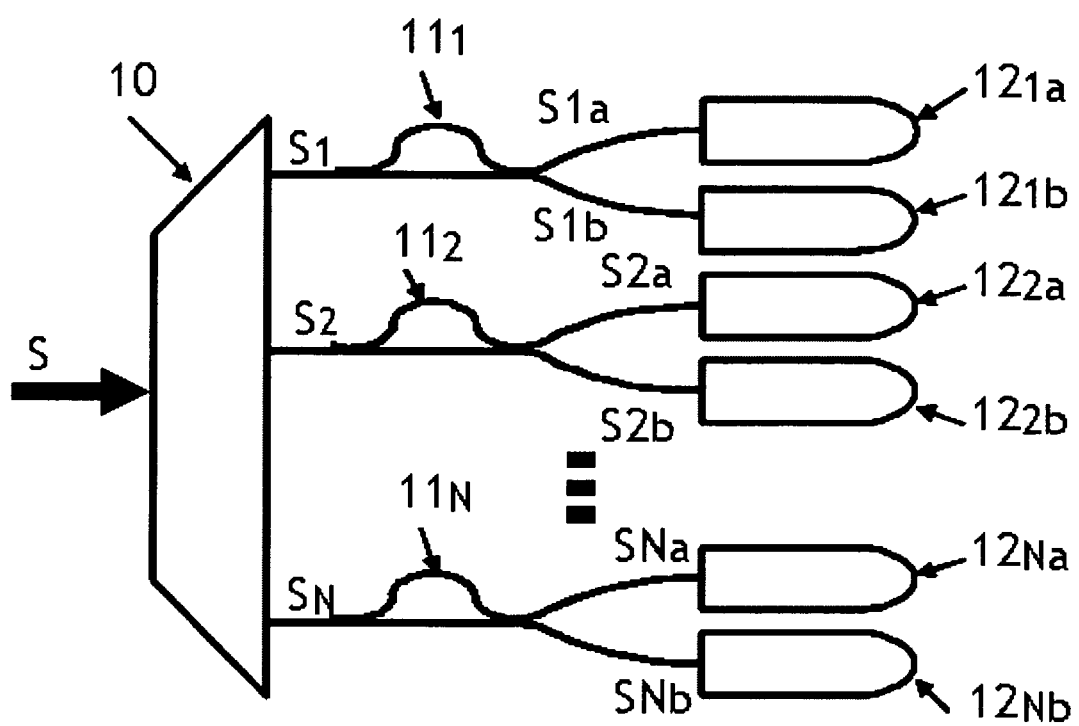
FIG. 1a, already discussed, is an exemplary schematic representation of a conventional arrangement for demultiplexing a QPSK signal using a single frequency demultiplexer, followed by an array of delay filters.
Figure 1B:
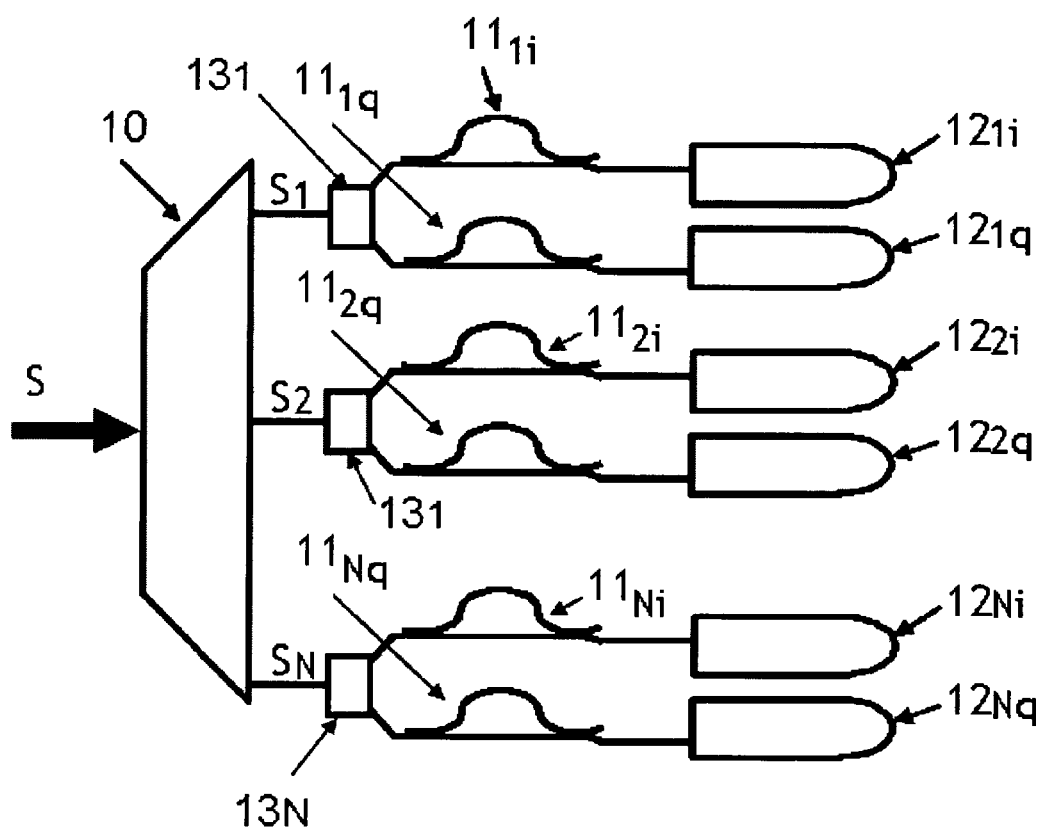
FIG. 1b, already discussed, is an exemplary schematic representation of a conventional arrangement for demultiplexing a DQPSK signal using a single frequency, demultiplexer followed by an array of power splitter and delay filters.
Figure 2A:
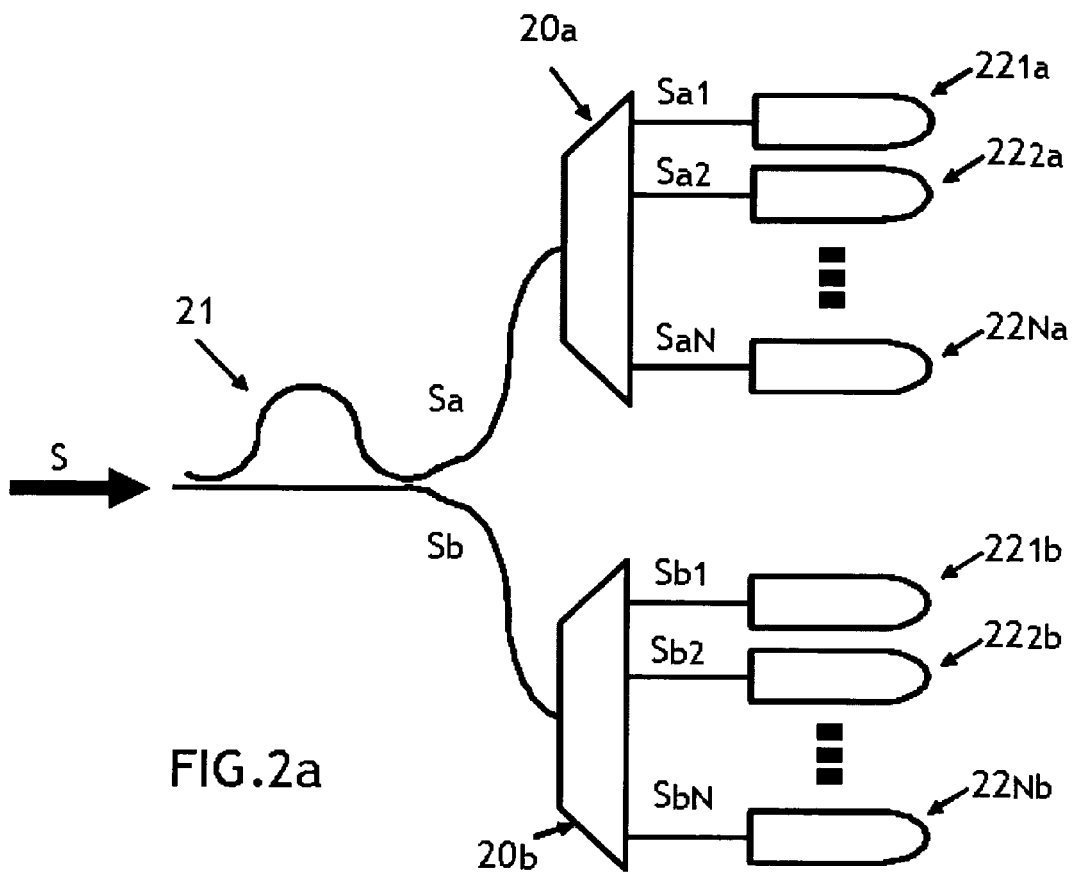
FIG. 2a, already discussed, is an exemplary schematic representation of another conventional arrangement for demultiplexing a QPSK signal using a single delay filter and two frequency demultiplexers.
Figure 2B:
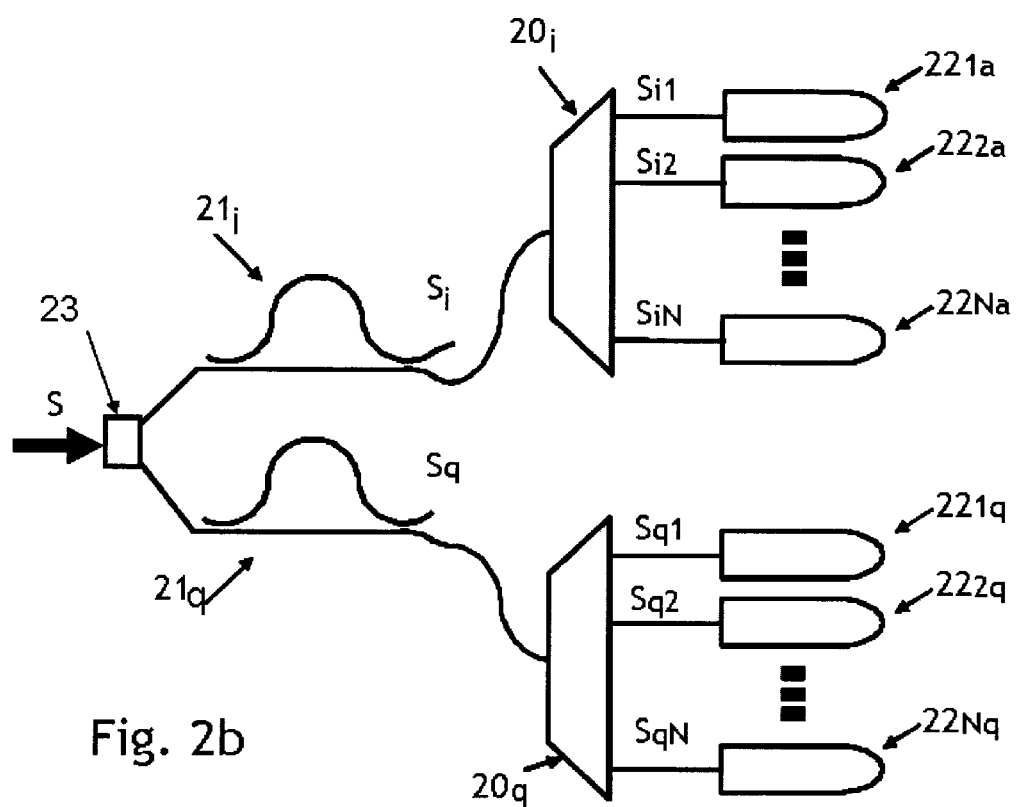
FIG. 2b, already discussed, is an exemplary schematic representation of another conventional arrangement for demultiplexing a DQPSK signal using a power splitter, a single delay filter and two frequency demultiplexers.
Figure 3A:
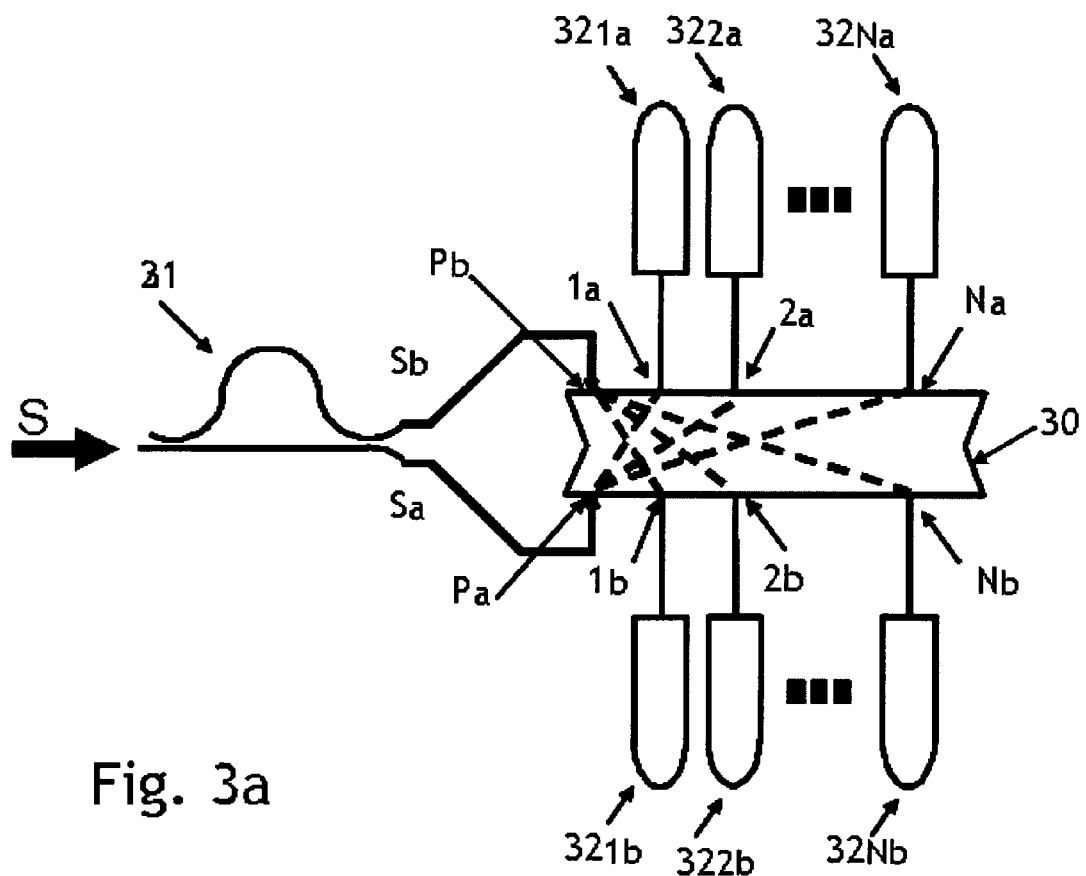
FIG. 3a is an exemplary schematic representation of an arrangement for demultiplexing a QPSK signal according to embodiments of the invention.

One exemplary embodiment is shown in FIG. 3a which is provided in relation to QPSK WDM wavelengths. As shown in the figure, an input signal S, comprising optical wavelengths modulated with QPSK format, is input into a delay filter 31 which separates the received signals into two streams $S_a$ and $S_b$ corresponding to the main constituent and the complementary constituent of the signal, the two streams $S_a$ and $S_b$ carrying multiplexed signals. The streams $S_a$ and $S_b$ are then input into respective input ports $P_a$ and $P_b$ located on the sides of a (N+1)×(N+1) AWG 30, i.e. an AWG with N+1 input ports and N+1 output ports. Once input into the (N+1)×(N+1) AWG 30, the steams $S_a$ and $S_b$ are separately demultiplexed within the same waveguide grating.

Therefore the use of a multi-input port, multi-output port AWG, when operated in a bi-directional mode provides the possibility of demultiplexing the two incoming streams using a single grating. This is possible thanks to the reciprocity between the input port and the output port of multi-input port, multi-output port AWG. It is to be noted that in principle, AWGs with a higher port count may also be used although this would increase the footprint of the device, in case such increase is tolerable, this option may be envisaged as well. Furthermore the use of only one single AWG is advantageous as it would only involve the footprint and the control power of a single device.

Referring back to FIG. 3a, the QPSK stream $S_a$ is input in the AWG 30 at input port $P_a$ and the QPSK stream $S_b$ is input in the AWG 30 at input port $P_b$. The stream $S_a$ is then demultiplexed in the AWG 30 into a plurality of single wavelengths that are directed towards output ports $1_a, 2_a, \ldots, N_a$. Similarly, the stream $S_b$ is demultiplexed in the AWG 30 into a plurality of single wavelengths that are directed towards output ports $1_b, 2_b, \ldots, N_b$.

Assuming that the stream $S_a$ is, for example, the main constituent of the input signal S, then the corresponding demultiplexed wavelengths travelling from the input port $P_a$ to the output ports $1_a, 2_a, \ldots, N_a$ of the AWG demultiplexer 30 would be the main constituents of the demultiplexed wavelengths of the original signal S. Likewise, assuming that the stream $S_b$ is, for example, the complementary constituents of the input signal S, then the corresponding demultiplexed wavelengths travelling from the input port $P_b$ to the output ports $1_b, 2_b, \ldots, N_b$ of the AWG demultiplexer 30 would be the complementary constituents of the demultiplexed wavelengths of the original signal. The wavelengths output from the output ports $1_a, 2_a, \ldots, N_a$ of the AWG demultiplexer 30 are preferably fed into respective detectors $32_{1a}, 32_{2a}, \ldots, 32_{Na}$ such as photodetectors. Likewise, wavelengths output from the output ports $1_b, 2_b, \ldots, N_b$ of the AWG demultiplexer 30 are preferably fed into respective detectors $32_{1b}, 32_{2b}, \ldots, 32_{Nb}$. In practice, the complementary constituents of the signal may simply be ignored and the main signal be maintained for further processing.

Figure 3B:
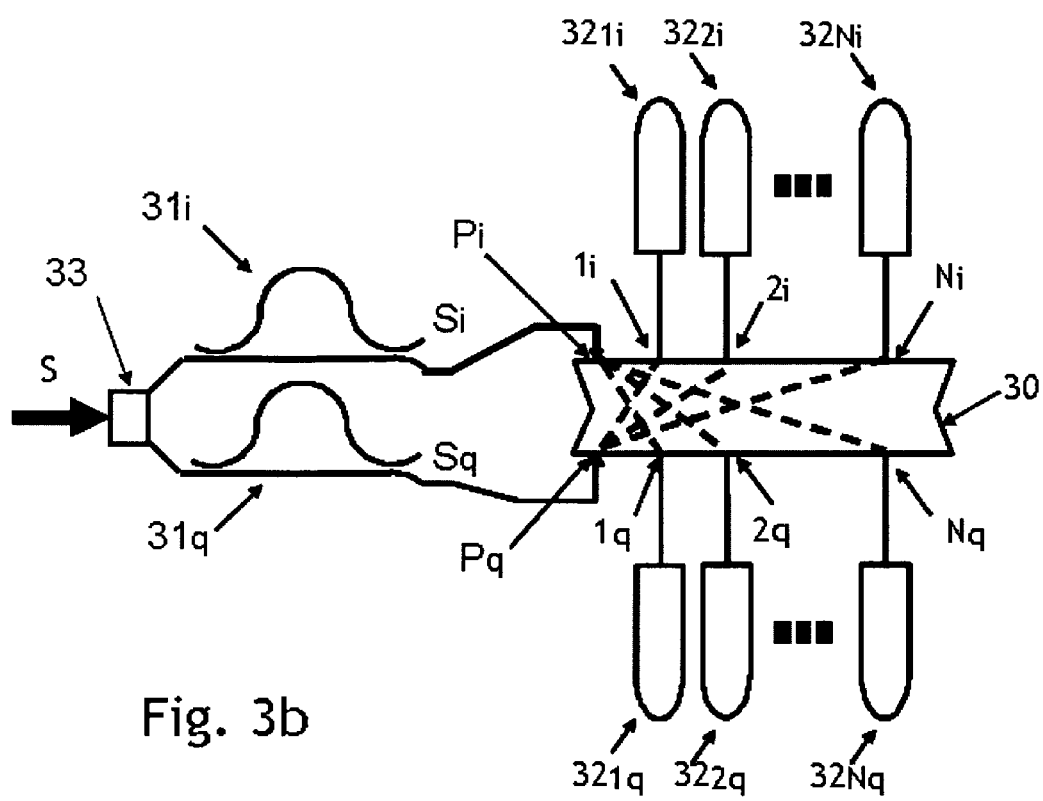
FIG. 3b is an exemplary schematic representation of an arrangement for demultiplexing a DQPSK signal according to embodiments of the invention.

Another exemplary embodiment is shown in FIG. 3b which is provided in relation to DQPSK WDM wavelengths. In this figure like elements have been given like reference numerals as those of FIG. 3a.

As shown in the figure, an input signal S, comprising DQPSK WDM wavelengths, is input into a power splitter 33 where the power of the incoming signal is split into two parts, typically equal in value and then the split parts are input into respective delay filters $31_i$, $31_q$. The delay filters $31_i$, $31_q$ have a slightly different delay response so that the in-phase and the quadrature-phase constituents of the original signal are reconstructed into a pair of amplitude modulated signals $S_i$ and $S_q$ carrying multiplexed signals. These reconstructed signals are input into respective input ports of a (N+1)×(N+1) AWG 30. As shown in FIG. 3b, the DQPSK stream $S_i$ is input in the AWG 30 at input port $P_i$, and the DQPSK stream $S_q$ is input in the AWG 30 at input port $P_q$.

The stream $S_i$ is then demultiplexed in the AWG 30 into a plurality of single wavelengths that are directed towards output ports $1_i$, $2_i$, . . . , $N_i$. Similarly, the stream $S_q$ is demultiplexed in the AWG 30 into a plurality of single wavelengths that are directed towards output ports $1_q$, $2_q$, . . . , $N_q$.

Assuming that the stream $S_i$ is, for example, the in-phase constituent of the input signal S, then the corresponding demultiplexed wavelengths travelling from the input port $P_i$ to the output ports $1_i$, $2_i$, . . . , $N_1$ of the AWG demultiplexer 30 would be the in-phase constituents of the demultiplexed wavelengths of the original signal S. Likewise, assuming that the stream $S_q$ is, for example, the quadrature-phase constituents of the input signal S, then the corresponding demultiplexed wavelengths travelling from the input port $P_q$ to the output ports $1_q$, $2_q$, . . . , $N_q$ of the AWG demultiplexer 30 would be the quadrature-phase constituents of the demultiplexed wavelengths of the original signal. The wavelengths output from the output ports $1_i$, $2_i$, . . . , $N_i$ of the AWG demultiplexer 30 are preferably fed into respective detectors $32_{1i}$, $32_{2i}$, . . . , $32_{Ni}$ such as photodetectors. Likewise, wavelengths output from the output ports $1_q$, $2_q$, . . . , $N_q$ of the AWG demultiplexer 30 are preferably fed into respective detectors $32_{1q}$, $32_{2q}$, . . . , $32_{Nq}$.

In all the embodiments of the invention, the use of a multi-input port, multi-output port AWG, when operated in a bi-directional mode provides the possibility of demultiplexing the two incoming streams while only one single AWG is used which is advantageous as it would only involve the footprint and the power consumption of a single device. The fact that the multi-input port, multi-output port AWG 30 operates in bi-directional mode allows for the possibility of having signals travelling in different directions from one side to the other within the AWG 30 such that the wavelengths input from a first input port (e.g. $P_a$ or $P_i$) travel in a first direction, whereas the wavelengths input from a second input port (e.g. $P_b$ or $P_q$) travel in a second direction which is different from the first direction. Preferably the input ports in an embodiment are located on opposite sides and symmetrical with respect to a longitudinal axis of the frequency demultiplexer, in this case AWG 30, however this is not mandatory. The input ports in an embodiment may also be located at positions which are not symmetrical with respect to the longitudinal axis of the frequency demultiplexer as long as a bidirectional operation of the AWG is employed.

Furthermore, given the wavelengths of the optical carrier of the WDM signal, the AWG can be engineered to avoid any possible conflict in the port assignment.

In order to demultiplex N optical wavelengths, the AWG may have at least N+1 ports on either side where one port is intended for use as an input port and N ports are intended for use as output ports so as to receive the wavelengths launched from the corresponding input port and demultiplexed by the grating. The corresponding input port is preferably located at the opposite side of the grating with respect to the side where the corresponding output ports are located. It is to be noted that in practice, a (N+1)×(N+1) AWG is marginally larger in size than a single 1×N AWG demultiplexer, therefore this solution clearly contributes to reducing the size of the overall device because one (N+1)×(N+1) AWG occupies a smaller space as compared to two 1×N AWGs. Furthermore, the integration of the entire arrangement into a single chip is greatly improved. In addition, due to the fact that the two streams ($S_a$ & $S_b$ or $S_i$ & $S_q$) use the same grating structure, there would be the need for only one controller to adjust the grating onto the desired frequency grid. Thus, when the grating is aligned for one stream it will be automatically so aligned for the other stream and no relative drift between the two streams is possible.

The proposed solution provides the possibility of reducing the number of electrical and/or thermal controllers needed to keep all the parts adjusted within the frequency ranges as required by a particular application, such as for example the ITU frequency grid as defined in the ITU standard for WDM systems, and contributes to a substantial reduction in the footprint of the entire arrangement. The arrangements obtained according to the proposed solution may also be easily implemented in a fully integrated form, ie in one photonic integrated circuit.

Although the embodiments described above were provided in an exemplary manner in relation QPSK and DQPSK signals, it is to be noted that as already mentioned above, the present solution also applicable to any transmission format that comprises multiple wavelengths where the wavelengths comprise constituents that can be separated into distinct streams or detected according to differential detection schemes. For example in case polarization multiplexed signals are used, the power splitter—delay filter pair used for demodulating DQPSK signals may be replaced by a polarization splitter and the arrangement may therefore turn into a WDM receiving device for polarization multiplexed signals.

Therefore, where in the case of DQPSK, the criterion for separation of the streams is separating the in-phase constituents from the quadrature-phase constituents, in the case of polarization multiplexed signals, the criterion for separation of streams may be separating the constituents of the signal corresponding to one polarization, for example horizontal, from the constituents of the signal corresponding to another polarization, for example vertical.

Furthermore, it is possible to implement a polarization-multiplexed DQPSK receiver using a single delay filter, two polarization splitters and a single bi-directional AWG with 2(N+1) ports or by combining one polarization splitter, two delay filters and one 2(N+1)-ports AWG. In this case, the criterion for separating the signals may be a combination of criteria for separating streams according to the in-phase constituents from the quadrature-phase constituents, and separating according to the different polarization constituents or vice versa.

In various embodiments, the pair of delay filter and the power splitter may be consolidated into a single delay filter merged into a star coupler which is in charge of receiving the filtered constituents and route them towards the desired elements in the circuit.

The present solution therefore provides a possibility to consolidate multiple elements needed for wavelength demultiplexing of complex signal formats such as for example QPSK, DQPSK or polarization multiplexed signals into fewer elements. Having two or even one single element to manage simplifies the control mechanism, reduces the footprint, reduces the power consumption as only one thermoelectric cooler would be needed, and can be more easily integrated into a photonic integrated circuit. In practice, it is understood that fewer elements usually correspond to higher reliability.

The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

It should be appreciated by those skilled in the art that any block diagrams herein represent conceptual views of illustrative circuitry embodying the principles of the invention.

The invention claimed is:

1. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein
the first output of the separator is coupled to a first input of a bi-directional multi-input port, multi-output port frequency demultiplexer and the second output of the separator is coupled to a second input of the bi-directional multi-input port, multi-output port frequency demultiplexer,
the demultiplexer is in a photonic integrated circuit (IC), and
a grating includes at least a first output port located at an opposite side of a grating with respect to the side where the first group of single wavelengths is input in the grating, and at least a second output port located at an opposite side of the grating with respect to the side where the second group of single wavelengths is input in the grating.

2. A receiver for receiving WDM signals comprising a demultiplexer according to claim 1.

3. The demultiplexer of claim 1, wherein the bi-directional multi-input port, multi-output port frequency demultiplexer is configured to separately demultiplex the first and second streams of wavelengths in a same grating.

4. The demultiplexer of claim 1 wherein the bi-directional multi-input port, multi-output port frequency demultiplexer is an array waveguide grating or an echelle grating.

5. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein
the first output of the separator is coupled to a first input of a bi-directional multi-input port, multi-output port frequency demultiplexer and the second output of the separator is coupled to a second input of the bi-directional multi-input port, multi-output port frequency demultiplexer,
the demultiplexer is in a photonic integrated circuit (IC), and
the separator includes a delay filter and the multiple wavelength streams modulated with QPSK format.

6. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein
the first output of the separator is coupled to a first input of a bi-directional multi-input port, multi-output port frequency demultiplexer and the second output of the separator is coupled to a second input of the bi-directional multi-input port, multi-output port frequency demultiplexer,
the demultiplexer is in a photonic integrated circuit (IC), and
the separator includes a power splitter and a delay filter and the multiple wavelength streams are DQPSK-type stream.

7. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein
the first output of the separator is coupled to a first input of a bi-directional multi-input port, multi-output port frequency demultiplexer and the second output of the separator is coupled to a second input of the bi-directional multi-input port, multi-output port frequency demultiplexer,
the demultiplexer is in a photonic integrated circuit (IC), and
the separator includes a polarization splitter and the multiple wavelength streams are polarization multiplexed streams.

8. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein
the first output of the separator is coupled to a first input of a bi-directional multi-input port, multi-output port frequency demultiplexer and the second output of the separator is coupled to a second input of the bi-directional multi-input port, multi-output port frequency demultiplexer,
the demultiplexer is in a photonic integrated circuit (IC), and
the separator is a combination of at least one power splitter, at least one delay filter and at least one polarization splitter and the multiple wavelength streams are polarization multiplexed DPQSK streams.

9. A demultiplexer for demultiplexing multiple wavelength streams, comprising:
a separator configured to separate the multiple wavelength streams into a first stream of wavelengths output from a first output of the separator and a second stream of wavelengths output from a second output of the separator, wherein the first output of the separator is coupled to a first input of a bi-directional multi-input port, multi-output port frequency demultiplexer and the second output of the separator is coupled to a second input of the bi-directional multi-input port, multi-output port frequency demultiplexer, the demultiplexer is in a photonic integrated circuit (IC), and the input ports are located on opposite sides and symmetrical with respect to a longitudinal axis of the frequency demultiplexer.

10. A method of demultiplexing multiple wavelength streams, the method comprising:

inputting multiple wavelength streams into a separator;

separating, according to at least one predetermined separation criterion, the multiple wavelength streams into a first stream of wavelengths and a second stream of wavelengths;

inputting the first stream of wavelengths into a first input port of a multi-input port, multi-output port frequency demultiplexer;

inputting the second stream of wavelengths into a second input of the multi-input port, multi-output port frequency demultiplexer;

separating the first stream into a first group of single wavelengths;

separating the second stream into a second group of single wavelengths;

coupling the first group of single wavelengths to respective first output ports of a grating; and coupling the second group of single wavelengths to respective second output ports of the grating, wherein the first group of single wavelengths are coupled to respective output ports located at an opposite side of the grating with respect to the side where the first group of single wavelengths is input in the grating, and the second group of single wavelengths are coupled to respective output ports located at an opposite side of the grating with respect to the side where the second group of single wavelengths is input in the grating.

* * * * *